United States Patent [19]

Jongenburger et al.

[11] Patent Number: 5,174,952
[45] Date of Patent: Dec. 29, 1992

[54] PROCESS FOR THE POWDER-METALLURGICAL PRODUCTION OF A WORKPIECE

[75] Inventors: Peter Jongenburger, Arnhem, Netherlands; Christoph Tönnes, Wettingen; Clemens Verpoort, Fislisbach, both of Switzerland

[73] Assignee: Asea Brown Boveri Ltd., Baden, Switzerland

[21] Appl. No.: 578,248

[22] Filed: Sep. 6, 1990

[30] Foreign Application Priority Data

Sep. 13, 1989 [CH] Switzerland .................. 3343/89

[51] Int. Cl.$^5$ .................................. B22F 1/00
[52] U.S. Cl. ................................. 419/23; 419/38; 419/49; 419/54; 419/55; 419/87; 419/58; 419/60
[58] Field of Search .................. 419/23, 38, 49, 54, 419/55, 57, 58, 60

[56] References Cited

U.S. PATENT DOCUMENTS

| | | | |
|---|---|---|---|
| 3,888,663 | 6/1975 | Reichman | 419/54 |
| 4,271,114 | 6/1981 | Ohno | 419/54 |
| 4,836,978 | 6/1989 | Watanabe et al. | 419/54 |

FOREIGN PATENT DOCUMENTS

| | | |
|---|---|---|
| 0191409 | 8/1986 | European Pat. Off. |
| 0246162 | 11/1987 | European Pat. Off. |
| 2703483 | 8/1978 | Fed. Rep. of Germany |
| 8700781 | 2/1987 | PCT Int'l Appl. |
| 2088414 | 6/1982 | United Kingdom |

OTHER PUBLICATIONS

"Plastic Metals: From Fiction to Reality with Injection Molded P/M Materials", Billiet, Parmatech Corporation, pp. 45–52 (undated).
"Pulvermetallurgisches Spritzgiessen–ein neues Formgebungsverfahren fur Sinterteile komplizierter Gestalt", Lange, et al., Konstruktion, 1988, pp. 233–238.
"Powder Casting and Metal Injection Moulding", Sjoberg, Metal Powder Report Manuscript submission, Sep., 1987.

Primary Examiner—Stephen J. Lechert, Jr.
Attorney, Agent, or Firm—Burns, Doane, Swecker & Mathis

[57] ABSTRACT

A process for the powder-metallurgical production of a workpiece by filling a binder-free and solvent-free, dry metal powder or ceramic powder into a mold, precompacting the powder by tapping and presintering it for ½ hour to 1 hour at 0.65 to 0.85 times the absolute melting temperature without significant shrinkage, adjacent powder particles being joined merely at their contact points by necking to give a skeletal formed body. The formed body is taken out of the mold and finish-sintered at at least 0.9 times the absolute melting temperature for at least 1 hour without additional support by a mold. Advantageously, the sintered body is additionally hot-isostatically pressed containerless in order to reach at least 98% of the theoretical density.

5 Claims, 2 Drawing Sheets ion 40 (1988) 233–238

Göran Sjöberg, "Powder Casting and Metal Injection Moulding", manuscript submitted to Metal Powder Report September 1987

The known processes leave something to be desired. There is therefore a demand for improvement and further development of the powder-metallurgical/powder-ceramic fabrication methods.

PROCESS FOR THE POWDER-METALLURGICAL PRODUCTION OF A WORKPIECE

BACKGROUND OF THE INVENTION

1. Field of the Invention

Production of complicated components from metallic or ceramic materials, the starting materials used being powders. Questions of sintering and hot-isostatic pressing with regard to the shrinkage.

The invention relates to the further development, perfection and simplification of powder-metallurgical fabrication methods for the production of workpieces having comparatively complicated shapes, where the problems of shrinkage during sintering play an important part. The field of application is especially the sector of turbine engineering components.

In the narrower sense, the invention relates to a process for the powder-metallurgical production of a workpiece, utilizing a sintering process in which a powder or powder mixture is first filled into a mold and mechanically precompacted by tapping, jolting or vibration.

2. Discussion of Background

Numerous fabrication methods in the metallurgical and ceramic industry start from powders. Powder-metallurgical processes have the advantage that virtually any desired shape can be obtained. It is intended to produce workpieces as finished components by powder metallurgy, in order to be able partially or wholly to save expensive machining costs. The known processes for achieving net shapes or near-net shapes of the workpieces all start from suspensions (slip, paste) of powders in solvents, using a binder. The following are used as additives to powder mixtures:

Water+binder+additives (slip casting, freeze drying)

Water+cellulose (metal powder injection-molding according to Rivers: MIM by Rivers process)

Thermoplastics (metal powder injection-molding)

In all these wet-mechanical methods, numerous difficulties arise with respect to quality, freedom of design, reproducibility and selection of the composition:

Bubble formation on mixing of powder with binder and solvent.

Limitation of the wall thickness of the workpieces (for example at most 5–10 mm for MIM) since otherwise the binder can no longer be completely removed.

Appearance of binder residues (for example carbon) which remain in the workpiece even after the binder has been "burned out" and can impair the composition of the workpiece in an uncontrolled fashion.

Necessity of new selection/new development of the binder when changing over to other shapes and/or compositions of the workpieces.

Regarding the state of the art, the following printed publications are cited:

British Patent Application 2,088,414

European Patent Application 0,191,409

R. Billet, "PLASTIC METALS: From fiction to reality with injection-molded P/M materials", Parmatech Corporation, San Rafael, CA, P/M-82 in Europe Int. PM-Conf. Florence I 1982.

E. Lange and M. Poniatowski, "Pulvermetallurgisches Spritzgiessen - ein neues Formgebungsverfahren für Sinterteile komplizierter Gestalt [Powder-metallurgical injection-molding—a new shaping process for sintered components of complicated shape]", Konstruktion 40 (1988) 233–238

SUMMARY OF THE INVENTION

Accordingly, one object of this invention is to provide a process by means of which, starting from metal powders or ceramic powders, a workpiece of comparatively complicated shape and of any desired cross-section and unlimited wall thickness can be fabricated. The process should give a reproducible finished product which no longer needs to be machined, or at most needs a slight additional machining. Bubbles and undesired harmful residues are to be avoided in the powder processing. With respect to the selection of shape and composition of the workpieces to be produced, the process should ensure the widest possible freedom and universal applicability.

This object is achieved, in the process mentioned at the outset, by presintering the precompacted powder in a first phase for ½ hour to 1 hour at a comparatively low temperature, which is in the range from 0.65 to 0.85 times the absolute melting temperature of the material to be used for the workpiece, in such a way that the individual powder particles are mutually joined only at their contact points by necking without significant shrinkage, carefully removing the formed body presintered in this way from the mold or destroying the latter, and finally finish-sintering the formed body in the freely self-supporting state for at least 1 hour up to a density of at least 90% of the theoretical value at an increased temperature which is at least 0.9 times the absolute melting temperature.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
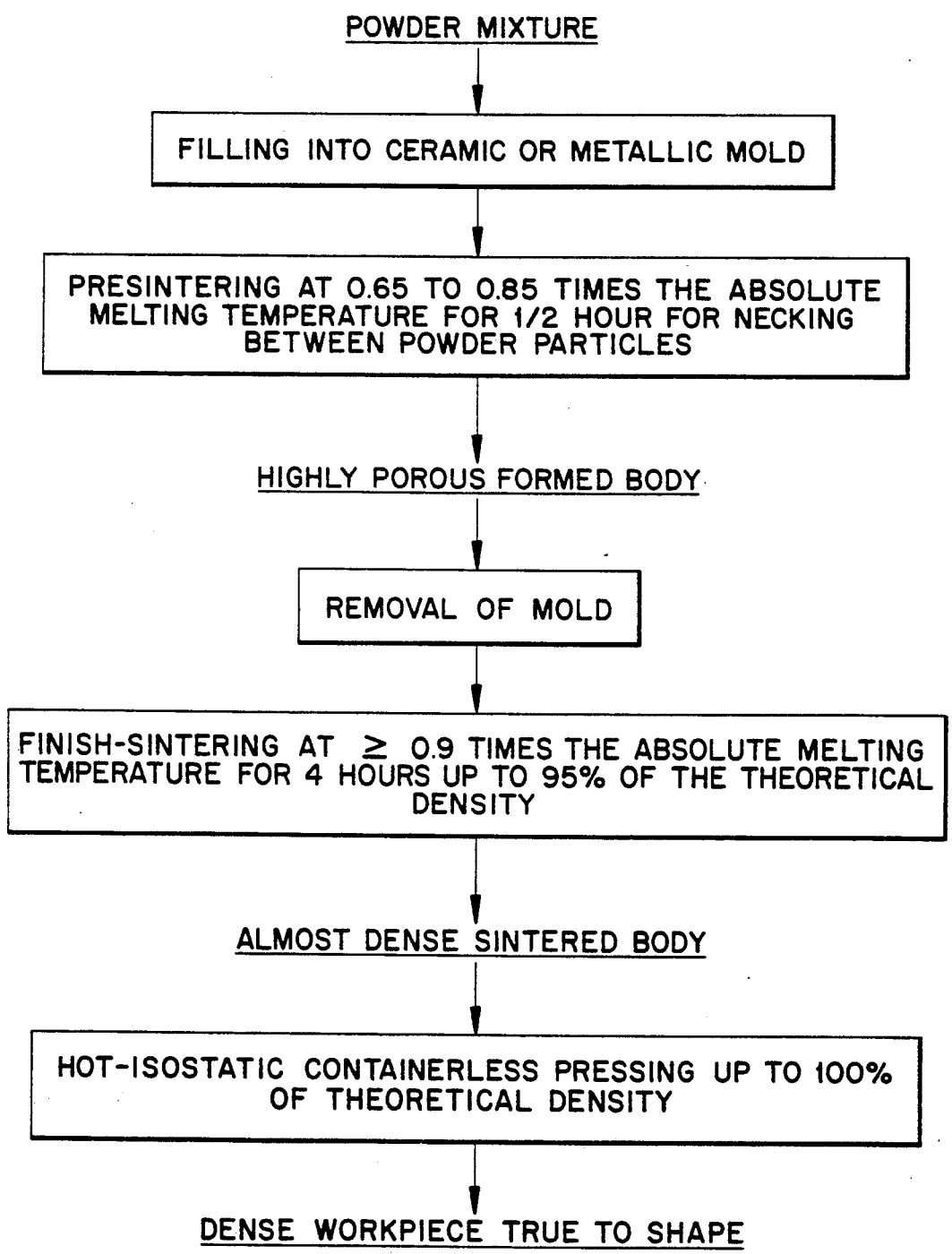
FIG. 1 shows a general flowsheet (block diagram) of the process.

Referring now to the drawings, wherein like reference numerals designate identical or corresponding parts throughout the several views, in FIG. 1 a flowsheet (block diagram) of the process is shown in the most general way. In this illustration, the stepwise compaction of the powder by filling into the mold, presintering, finish-sintering and hot-isostatic pressing can clearly be seen. The diagram does not require any further explanations.

Figure 2:
FIG. 2 shows a diagrammatic section through an aggregate of loose powder particles in the initial state.

FIG. 2 relates to a diagrammatic section through an aggregate of loose powder particles in the initial state. 1 represents loose powder particles in the state as delivered before they are filled into the mold. The powder particles 1 are drawn in such a way that they are virtually not in contact with one another, in order to distinguish this state of low bulk density from the subsequent successive compaction.

Figure 3:
FIG. 3 shows a diagrammatic section through an agglomeration of lightly compacted powder particles after filling into the mold.

FIG. 3 shows a diagrammatic section through an agglomeration of lightly compacted powder particles after they have been filled into the mold. 2 represents powder particles which have been lightly compacted by tapping, jolting or vibration of the mold after they have been filled into the latter. The powder particles 2 are in mutual point contact.

Figure 4:
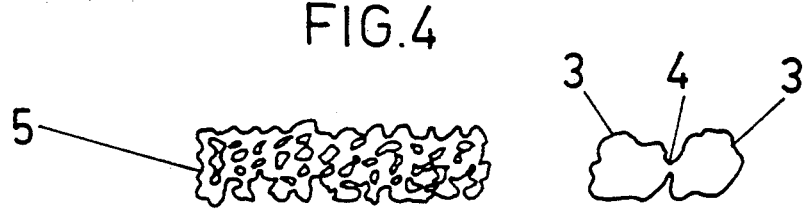
FIG. 4 shows a diagrammatic section through a presintered formed body and powder particles after presintering.

In FIG. 4, a diagrammatic section through a presintered formed body and powder particles after presintering are shown. 3 designates two adjacent powder particles after presintering. As a result of this heat treatment, a bridge, called a neck 4, forms at the contact point owing to mutual diffusion. This is a true metallurgical bond (in the case of metal particles). 5 is the resulting skeletal presintered formed body consisting of powder particles which are joined pointwise via said necks.

Figure 5:
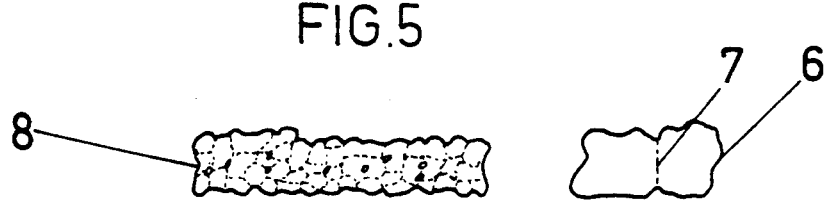
FIG. 5 shows a diagrammatic section through a sintered body and powder particles after finish-sintering.

FIG. 5 relates to a diagrammatic section through a sintered body and powder particles after finish-sintering. 6 represents two adjacent powder particles after finish-sintering, which are almost completely welded by diffusion. The former contact zone 7 of the adjacent powder particles after complete sintering together is indicated by a broken line. 8 is the resulting sintered body of low porosity.

Figure 6:
FIG. 6 shows a diagrammatic section through a finished dense workpiece true to shape and powder particles after hot-isostatic pressing.

FIG. 6 shows a diagrammatic section through a finished dense workpiece true to shape and powder particles after hot-isostatic pressing. 9 represents two adjacent powder particles after hot-isostatic pressing. The particles are completely welded by diffusion under pressure from all sides. 10 is the former grain boundary of the adjacent powder particles after complete compaction by hot-isostatic pressing. A finished workpiece 11 true to shape is present as the end product after hot-isostatic pressing.

ILLUSTRATIVE EXAMPLE 1

As a workpiece, a blade for a rotary thermal machine, in the present case for an axial-flow compressor, was produced. The blade with aerofoil cross-section had the following end dimensions:

| | |
|---|---|
| Length = | 120 mm |
| Width = | 26 mm |
| Greatest thickness = | 3.5 mm |
| Profile height = | 7 mm |

The material selected was a Cr steel of the German DIN description X20CrMoV 12 1 having the following composition:

| | |
|---|---|
| CR = | 12% by weight |
| Mo = | 1% by weight |
| V = | 0.3% by weight |
| C = | 0.20% by weight |
| Fe = | Remainder |

For producing the blade, the starting material was a powder produced by gas jet atomization and having a maximum particle size of 50 μm. The powder was filled dry, without any binder, into a ceramic mold of $Al_2O_3$ which had been linearly enlarged in its internal dimensions by about 10%, and precompacted cold by tapping the mold 50 times. In this way a tap density of about 64% of the full density was reached. The filling end of the ceramic mold was blocked with steel wool and then fixed with a wire, in order to prevent later emergence of the powder during process handling. The filled mold was then evacuated, for which purpose a vacuum furnace flooded with argon was used. The atmosphere for presintering was consequently argon at a residual pressure of 5 mbar.

For presintering of the powder, the whole was then heated for 1 hour at a temperature of 1100° C. As a result of necking between adjacent powder particles, a skeletal formed body was thus formed which, after cooling, had sufficient strength to allow the ceramic mold to be removed. The latter was divided in such a way that it could be used again. In this presintering process, the shrinkage was virtually equal to zero, so that it was possible to take the formed body out of the mold without difficulty. This body was then finish-sintered, resting freely on a base without supporting mold, in a vacuum furnace at a temperature of 1350° C. for 4 hours in an argon atmosphere of 1 mbar residual pressure. During this, it shrank linearly by about 10%, which corresponded to a volume shrinkage of about 27%. A density of 92% of the theoretical value was reached in this case.

ILLUSTRATIVE EXAMPLE 2

The workpiece fabricated was a blade of dimensions similar to those indicated under Example 1. The material was X20CrMo V 12 1. The procedure was essentially the same as in Example 1. The finish-sintering was carried out at a temperature of 1380° C. for 2 hours. The density reached was 94% of the theoretical value.

The workpiece was then additionally hot-isostatically re-pressed by introducing it, without previous encapsulation (containerless), into a hot press and subjecting it for ½ hour to a pressure of 2000 bar on all sides at a temperature of 1200° C. The density thus reached was 99% of the theoretical value.

ILLUSTRATIVE EXAMPLE 3

A turbine blade having an aerofoil profile of the following dimensions was produced:

| | |
|---|---|
| Length = | 160 mm |
| Width = | 30 mm |
| Greatest thickness = | 5 mm |
| Profile height = | 10 mm |

The material used was a Cr/Ni steel of the description AISI 316 with the following composition:

| | |
|---|---|
| Cr = | 17% by weight |
| Mo = | 2.2% by weight |

-continued

| | |
|---|---|
| Ni = | 12% by weight |
| Mn = | 2% by weight |
| Si = | 1% by weight |
| C = | 0.08% by weight |
| Fe = | Remainder |

The powder used had been produced by gas jet atomization and had a maximum particle size of 30 μm. Filling into the mold and precompaction of the powder were carried out in a manner analogous to Example 1. The presintering took place under an $N_2/H_2$ atmosphere at 1000° C. for ½ hour. After removal of the mold, finish-sintering was carried out under a pressure of 1 bar at a temperature of 1370° C. for 2 hours under an argon atmosphere.

The workpiece reached a density of 93% of the theoretical value.

ILLUSTRATIVE EXAMPLE 4

The workpiece produced was a compressor blade of the same dimensions and the same composition (X20CrMoV 12 1 steel). The starting powder produced by gas atomization had a particle size of not more than 20 μm. The presintering process was carried out at a temperature of 900° C. for ½ hour under an $N_2$ atmosphere. After removal of the mold, the finish-sintering took place in the atmosphere indicated under Example 3 at a temperature of 1350° C. for 1 hour under a pressure of 1 bar.

The density reached by the workpiece was 95% of the theoretical value.

The invention is not restricted to the illustrative examples.

The process for the powder-metallurgical production of a workpiece, utilizing a sintering process in which a powder or powder mixture is first filled into a mold and mechanically precompacted by tapping, jolting or vibration, is carried out by presintering the precompacted powder in a first phase for ½ hour to 1 hour at a comparatively low temperature, which is in the range from 0.65 to 0.85 of the absolute melting temperature of the material to be used for the workpiece, in such a way that the individual powder particles are mutually joined only at their contact points by necking without significant shrinkage, carefully removing the formed body presintered in this way from the mold or destroying the latter, and finally finish-sintering the formed body in the freely self-supporting state for at least 1 hour up to a density of at least 90% of the theoretical value at an increased temperature which is at least 0.9 times the absolute melting temperature. Preferably, the workpiece is additionally subjected to containerless hot-isostatic pressing in order to reach a density of 98 to 100% of the theoretical value.

In a particular embodiment of the process, the presintering process is carried out in vacuo or under a reduced-pressure argon atmosphere.

In another embodiment of the process, the presintering process is carried out under an $N_2$ or $N_2/H_2$ atmosphere.

Advantageously, the process is carried out by using a steel powder of a 12% Cr steel with further small additions of Mo and V and of a particle size of at most 50 μm as the powder, presintering for ½ hour to 1 hour in the range from 900° to 1100° C. and finish-sintering for 1 hour to 4 hours in the range from 1330° to 1430° C.

Obviously, numerous modifications and variations of the present invention are possible in the light of the above teaching. It is therefore to be understood that within the scope of the appended claims, the invention may be practiced otherwise than as specifically described herein.

What is claimed as new and desired to be secured by letters patent of the United States is:

1. A process for the powder-metallurgical production of a workpiece, utilizing a sintering process in which a powder or powder mixture is first filled into a mold and mechanically precompacted by tapping, jolting or vibration, which comprises presintering the precompacted powder in a first phase for ½ hour to 1 hour at a comparatively low temperature, which is in the range from 0.65 to 0.85 times the absolute melting temperature of the material to be used for the workpiece, in such a way that the individual powder particles are mutually joined only at their contact points by necking without significant shrinkage, carefully removing the formed body presintered in this way from the mold or destroying the latter, and finally finish-sintering the formed body in the freely self-supporting state for at least 1 hour up to a density of at least 90% of the theoretical value at an increased temperature which is at least 0.9 times the absolute melting temperature.

2. A process as claimed in claim 1, wherein the workpiece is additionally subjected to a containerless hot-isostatic pressing in order to reach a density of 98 to 100% of the theoretical value.

3. A process as claimed in claim 1, wherein the presintering process is carried out in vacuo or under a reduced-pressure argon atmosphere.

4. A process as claimed in claim 1, wherein the presintering process is carried out under an $N_2$ or $N_2/H_2$ atmosphere.

5. A process as claimed in claim 1, wherein a steel powder of a 12% Cr steel with further small additions of Mo and V and of a particle size of at most 50 μm is used as the powder, presintered for ½ hour to 1 hour in the range from 900° to 1100° C. and finish-sintered for 1 hour to 4 hours in the range from 1330° to 1430° C.

* * * * *